Oct. 23, 1951     R. GOUIRAND     2,572,471

VALVE

Filed March 2, 1945

INVENTOR.
Rene Gouirand
BY
Harry Rodzinski
Attorney

Patented Oct. 23, 1951

2,572,471

UNITED STATES PATENT OFFICE 2,572,471

VALVE

Rene Gouirand, New York, N. Y.

Application March 2, 1945, Serial No. 580,656

6 Claims. (Cl. 251—137)

This invention relates to valves, and more particularly to valves adapted for use in connection with air, gas and other fluids under pressure.

Valves now in use for this purpose possess certain deficiencies which prevent them from being effective under various working conditions. One of these deficiencies consists in the arrangement of the passages through the valve housing or casing whereby the imposition of pressure in a direction opposite to that in which it is intended that the pressure shall be imposed very often causes the valve to open and be held in open position at a time when it is desired that the valve shall remain closed. Another deficiency existent in valves of the type now in use, is leakage, and which is very often caused because of the use of packings at various vital points in the structure.

The present invention has for its primary object the provision of a valve having its passages so arranged and disposed that the opening of the valve under air or other fluid pressure at a time not desired, will not take place. Another object of the invention is to provide a valve in which the use of packings likely to permit leakage under pressure will be obviated.

Another object of the invention is to provide an air valve located between a pair of passages and adapted to allow communication between said passages only when the air therein is of a predetermined pressure, the valve being closed when the pressure in the passages and in air chambers to which said passages connect, is below a given level.

Another object of the invention is to provide, in a valve of this character, means by which the pressure in one or more air chambers to which the valve is connected, can be ascertained, whereby the valve will act as an indicating device.

These and other objects are accomplished by the invention, a more particular description of which will hereinafter appear and be set forth in the claims appended hereto.

Figure 1:
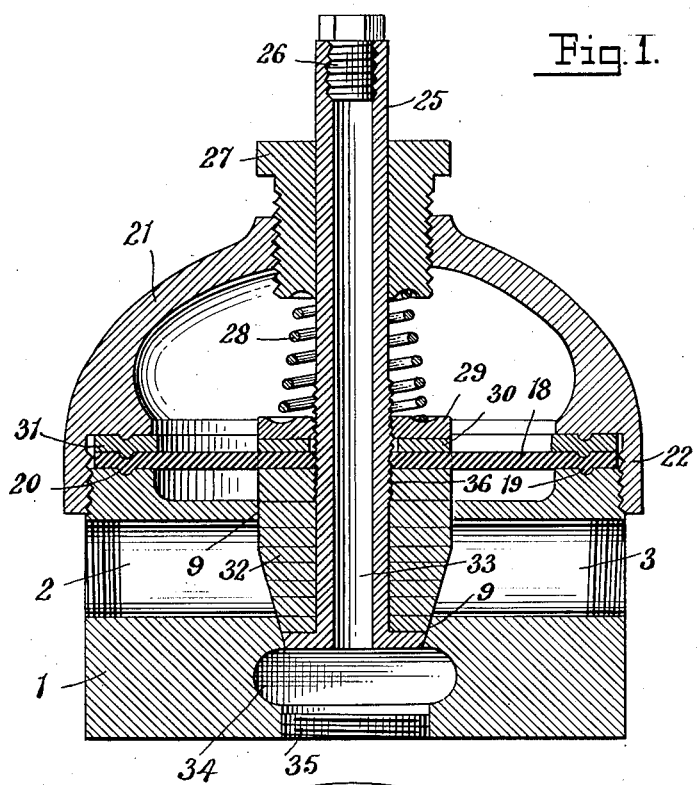
Figure 2:
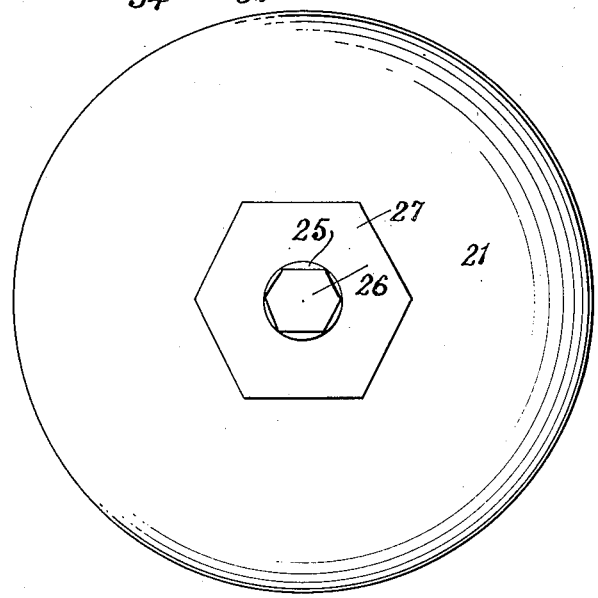

Reference is to be had to the accompanying drawings forming a part hereof, in which Fig. 1 is a vertical sectional view through the valve, as constructed in accordance with the invention; and Fig. 2 is a top plan view of the valve.

With reference to the structure shown in the drawings, 1 indicates the valve casing or housing which may be made in various shapes according to the use to which it may be put, and is shown in a generally cylindrical shape and provided with the passages 2 and 3. These passages are arranged diametrically opposite to one another and in axial alignment, or at least with their axes on the same level, and with the valve seat 9 disposed between them so that when the valve 32, of conical plug form, is in seated position as shown in Fig. 1, it shuts off communication between the two passages 2 and 3. The outlet ends of the two passages 2 and 3 are screw-threaded as shown, or otherwise provided with coupling means by which they may be attached to piping, hose or conduits.

In the embodiment of the invention shown in the drawing, the valve is provided with a head 32, shown to be of laminated construction and secured on a tubular stem 25. The upper end of the stem is closed by a Schrader valve core or other equivalent air valve of the tire type and generally indicated at 26 and threadably received in the end part of the tubular stem 25 in the conventional way. The tubular stem 25 extends slidably through a central aperture in the domed cap 21 and is surrounded by the threaded adjusting nut 27. A coil spring 28, surrounding the stem 25 is urged against a seat in the top of a nut 29 adjustable on the threaded portion of the stem 25. A washer 30 is interposed between the nut 29 and the upper face of the flexible diaphragm 18, the diaphragm being clamped between the washer 30 and the top of the valve head 32.

The marginal edge portion of the diaphragm is clamped between the top edge of the casing 1 and a gasket 31, by means of the domed cap member 21 which has the internally threaded skirt 22 threadably received on the threaded portion of the casing adjacent to its top. Diaphragm 18 is provided with the annular rib 19 received in a complementary groove 20 in the top of the casing, while the gasket 31 and the cap member 21 are also co-operatively ribbed and grooved in the manner clearly seen in Fig. 5 and by means of which a tight joint is secured at this point. The arrangement shown also permits of the rotation of the cap 21 in tightening the same in place without marring or defacing the top of the diaphragm 18.

The valve is useful in numerous environments, such as for example, the maintenance of equal air pressure in the two tires on one wheel of a motor truck or trailer, or at any other point where equal pressure is desired in two air chambers of any sort. In a tire arrangement as just mentioned, one of the tires will be connected to the passage 2 and the other to the passage 3. Assuming that it is desired to maintain a pressure of say 46 pounds in both tires. In such a case the spring 28 will be adjusted by manipulation of the nut 27 so that it will allow opening of the valve when a pressure of over 45 pounds is imposed on the valve. With the spring compression so adjusted, air is forced through the tire type valve 26 to pass through the tubular stem 25 to reach and build up pressure in the chamber 34 located below the valve 32. Said chamber is closed by a screw plug 35, and when the pressure in the chamber 34 reaches a point above 45 pounds, the pressure against the valve will force it open and hold it open while the continued flow of air will then proceed into the passages 2 and 3 to reach the tires or other air chambers to which the two passages are connected and inflate the tires or fill the air chambers until the pressure desired is reached, which should be greater than the pressure required to maintain the valve in open position. As long as pressure in the tires or other air chambers to which the valve is connected remains greater than the pressure required to open the valve 32, the greater pressure will hold the valve open and the air pressure in both tires or air chambers will remain equal. However, when the pressure in the tires falls below the predetermined level and below that required to maintain the valve in open position, the valve will close and communication will be shut off between the two passages 2 and 3. It will also be noted that while the valve 32 is open to establish communication between the passages 2 and 3, the stem 25 will be raised or projected out of the cap 21 to a considerable extent, such projection of the stem tending to act as an indicator to disclose the fact that sufficient pressure exists in the two tires or chambers to maintain the valve in open position. When the pressure in the tires or chambers lowers to such an extent as to allow the valve 32 to close, the stem 25 will be in retracted position and will serve to indicate to the observer that insufficient air pressure exists in the tires or chambers. The stem 25 can be provided with calibrations, or color indications to at once indicate the position of the valve and thus show the air-pressure condition in the tires or chambers.

While I have shown and described the improved valve as being adapted for use in certain environments, it will be obvious that it has a multitude of other uses, as will be clear to those skilled in this art.

What I claim is:

1. A valve having a casing provided with a passage having outlets at its opposite ends, said outlets leading out of the casing, a valve seat in said passage, a plug valve adapted to fit against the seat and when seated to shut off communication between the end portions of the passage, a diaphragm in which the valve is mounted, a spring co-operating with the diaphragm to normally maintain the valve in closed position and cause it to close the inner ends of the passage, and closure means for the casing including a part for confining the marginal edge portion of the diaphragm between it and the casing.

2. A valve having a casing provided with a pair of diametrically opposite, axially aligned passages leading out of the casing, a valve seat located between the passages, a plug valve arranged to rest against the seat and when so seated to shut off communication between the passages, the valve having a stem, a diaphragm surrounding the stem and supporting the valve, a spring co-operating with the diaphragm to normally maintain the valve in closed position, said diaphragm having its marginal edge supported on top of the casing, and a closure cap fitting on top of the casing and clamping the edge portion of the diaphragm between it and the top of the casing.

3. In a valve, a pair of passages, a valve seat located between the passages, a plug valve arranged for seating against the seat to thereby shut off communication between the passages, a tubular stem secured to the valve and providing a passage through the valve, an air valve of the tire type located in the passage through the stem, the casing having a chamber at one end of the plug valve with which the passage through the stem is in communication, said chamber being maintained whether the plug valve is open or closed, a flexible diaphragm supporting the plug valve, spring means operative against the diaphragm to normally hold the plug valve against the seat, and means on the casing for adjusting the compression of said spring means.

4. In a valve, a valve casing, a pair of passages leading out of the casing, a valve seat located between the same, a plug valve arranged for seating against the seat to thereby shut off communication between the passages, a tubular stem secured to the valve and providing a passage through the same, an air valve of the tire type located in the passage through the stem, the casing having a chamber at the inner end of the plug valve with which the passage through the stem is in communication, said chamber existing regardless of whether the valve is open or closed, a flexible, disk-like diaphragm through which the stem extends, means on the stem for clamping the central portion of the diaphragm between it and the plug valve, a spring surrounding the stem and acting to urge the plug valve toward seating position, a closure cap fitted on the casing and having a central opening through which the stem is axially movable, and means threadably mounted in the closure cap for adjusting the compression of the spring.

5. In a valve, a casing having a pair of axially aligned outlets leading out of the casing, a valve seat located between the outlets, a plug valve for seating against said seat and adapted when seated to shut off communication between the outlets, a diaphragm secured to the plug valve and being flexible to allow movement of the plug valve to or from the seat, a spring for urging the plug valve toward seating position, means for adjusting the compression of the spring, and a chamber in the casing at one end of the plug valve and constituting a constant air space in which air pressure can build up against the end of the plug valve to urge the plug valve toward open position against the pressure of the spring.

6. In a valve, a casing having a pair of oppositely disposed, axially aligned passages leading to the outside of the casing, a valve seat located between the passages, a plug valve for seating against the seat and when so seated to shut off communication between the passages, the valve having a stem extending out of the casing, the casing being provided with a closed chamber located below the valve and in which pressure is created to urge the valve to open position, the valve having a stem extending out of the casing, a diaphragm through which the stem extends, means for attaching the diaphragm to the stem, the edge portion of the diaphragm being seated upon the top of the casing, the diaphragm being provided near its edge with an annular rib, the top of the casing having an annular groove in which the rib on the diaphragm is received, a cap fitted on top of the casing and threadably mounted on the casing and clamping the edge portions of the diaphragm between it and the casing.

RENÉ GOUIRAND.

REFERENCES CITED

The following references are of record in the file of this patent:

UNITED STATES PATENTS

| Number | Name | Date |
|---|---|---|
| 180,451 | Beck | Aug. 1, 1876 |
| 1,311,898 | Jackson | Aug. 5, 1919 |
| 1,374,571 | Hummel | Aug. 12, 1921 |
| 1,994,958 | Moffett | Mar. 19, 1935 |
| 2,299,079 | Davis | Oct. 20, 1942 |

FOREIGN PATENTS

| Number | Country | Date |
|---|---|---|
| 596,938 | France | of 1925 |